UNITED STATES PATENT OFFICE.

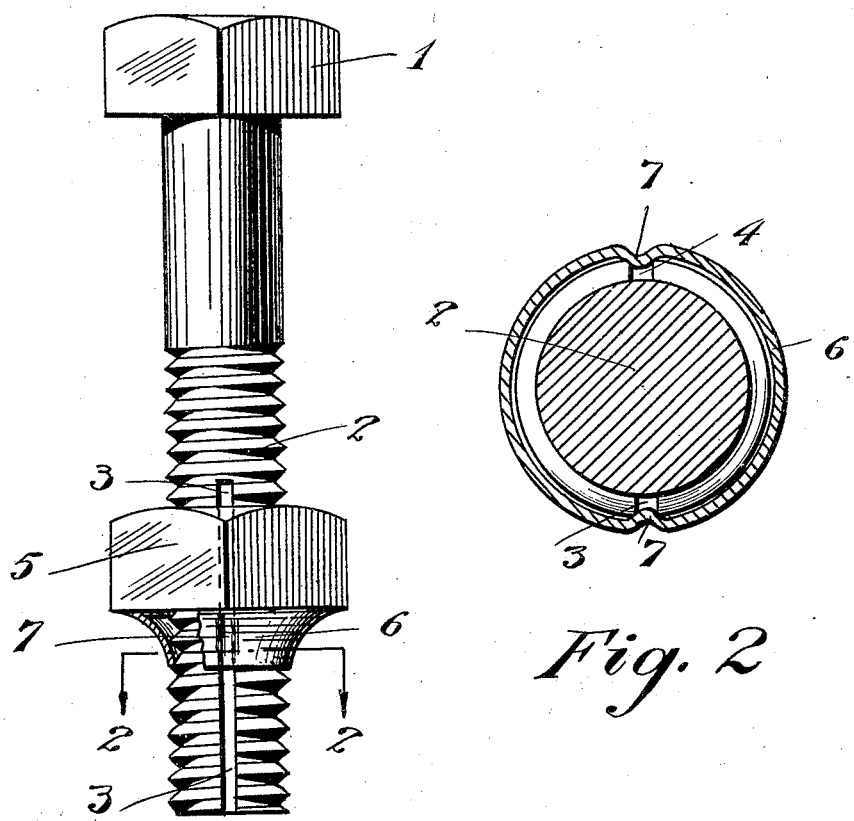

ROBERT ALFRED JOBERTY, OF WINNIPEG, MANITOBA, CANADA.

NUT LOCK.

1,410,812. Specification of Letters Patent. Patented Mar. 28, 1922.

Application filed October 15, 1920. Serial No. 417,216.

*To all whom it may concern:*

Be it known that I, ROBERT ALFRED JOBERTY, a citizen of the French Republic, residing at Winnipeg, Province of Manitoba, Canada, have invented certain new and useful Improvements in Nut Locks; and I do hereby declare that the following is a full, clear, and exact description of the invention, such as will enable others skilled in the art to which it appertains to make and use the same.

The present invention relates to nut locks and an object of the invention is to provide a nut locking means which is inexpensive and simple to manufacture.

Another object of the invention is to provide a nut lock, which will not become loose when subject to hard usage and vibration.

A further object is to provide a nut locking means, which when applied, will be easy to release without damaging the threads of nut or bolt.

With the above and other objects in view which will hereinafter appear as the description continues, the invention consists of novel features of construction, combination and formation of parts as will be hereinafter more fully described and particularly point out in the appended claim.

In the accompanying drawings is shown the simple and preferred form of the invention, it being, however, understood that no limitation is necessarily made to the precise structural details herein exhibited, but the right is hereby reserved to any changes or alterations that may be had and come within the scope of the invention without departing from the spirit thereof or sacrificing the efficency of the same.

In the drawings:

Figure 1 is a side elevation of a bolt and nut having a modified form of the present invention applied thereto and a portion thereof being in section; and, Figure 2 is a sectional view on line 2—2 of Figure 1.

Referring now more particularly to the drawings, wherein like and corresponding parts are designated by similar reference characters throughout the several views.

A bolt of the ordinary or any preferred type consists of a head 1 and the usual threaded shank 2. Arranged longitudinally within the threaded portion of shank, and diametrically opposite to each other are the grooves 3 and 4. A nut 5 is adapted to be screwed on the threaded portion of shank 2 in the usual manner. Secured to the outer face of nut and concavely extending towards bolt shank is the locking member 6 which is constructed from a soft metal and adapted to slide free over bolt threads.

In screwing nut to the desired position upon the threaded shank of bolt, the locking means are applied by causing an indent 7 to be made on the portions of locking member 6 which rest against the grooves 3 and 4. A light blow from any small tool is sufficient to cause the indentation 7 which will securely prevent the nut from rotating. When a nut is applied to a bolt in this manner, movement in any direction is prevented as the invention consists of no separate parts to become loose thus at all times proving a safe locking device.

In releasing the nut, the indent is smoothed by tapping a punch or nail within the grooves at the position the indents engage, thus allowing the nut to turn free.

Whereas other nut locking devices only allow the nut to be locked at the end of the shank, I have provided an invention in which the nut can be locked at any portion of the threaded shank and one that will be held securely thereto.

Having thus fully described my invention, what I claim as new and desire to secure by Letters Patent is:—

In a nut lock such as described, the combination with a bolt having a threaded portion provided with diametrically opposite longitudinally located grooves, said grooves being of a comparatively narrow width to allow a larger threaded area, a nut threaded upon said bolt, an annular flange integral with the nut and of softer metal concavely tapering from the sides of the nut to the threads of the bolt and the minor end of said concaved flange having indentations formed therein and engaging the grooves of the bolt, said indentations being correspondingly slight with the grooves and easily forced to assume their disengaged position substantially as and for the purpose specified.

In witness whereof I have hereunto set my hand.

ROBERT ALFRED JOBERTY.